Figure 1:
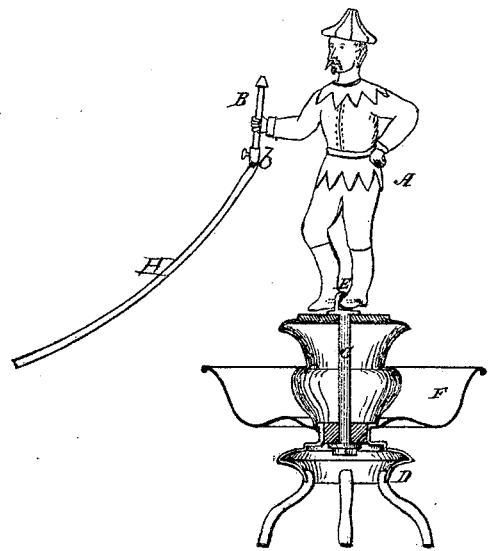
Figure 2:
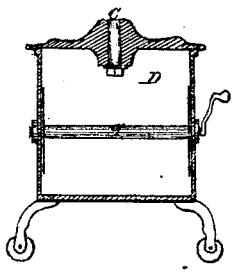

(167.)

*ORNAMENTAL LAWN SPRINKLER.*

*JOSEPH LESSLER,*

No. 121,949.                Patented Dec. 19, 1871.

WITNESSES.           INVENTOR

UNITED STATES PATENT OFFICE.

JOSEPH LESSLER, OF BUFFALO, NEW YORK.

IMPROVEMENT IN LAWN-SPRINKLERS.

Specification forming part of Letters Patent No. 121,949, dated December 19, 1871.

*To all whom it may concern:*

Be it known that I, JOSEPH LESSLER, of the city of Buffalo, in the county of Erie and State of New York, have invented a certain new Portable Fountain and Lawn-Sprinkler, of which the following is a specification:

My invention consists of a portable water-fountain and sprinkler, consisting of a stand and nozzle-holder, a nozzle or jet, and a flexible hose or pipe for connecting the stand with the hydrant, or other point from which water is supplied.

In the accompanying drawing, Figure I is an elevation of my apparatus. Fig. II is a sectional view of a stand provided with a reel, on which the hose can be wound when the apparatus is not in use.

D is a stand of any suitable construction. A represents the upper portion or nozzle-holder, preferably of ornamental shape, that shown being the figure of a man. B is a discharge-nozzle, of any ordinary construction; and H, a flexible pipe or hose, designed to be attached to the hydrant or other water-supply, and to serve as a conduit to the fountain or stand. The upper portion A of the stand is preferably pivoted to the base, as shown at C, and a second joint is also provided, as shown at E, whereby the nozzle-holder and nozzle may be made to face in either direction, and be inclined as required. F represents a basket surrounding the stand in which the rubber hose can be coiled when not in use. In Fig. II the stand is represented as constructed with a box or chamber in which a reel-spindle, G, is placed, on which the hose can be wound if desired.

My improved apparatus is intended more especially to be used for the purpose of sprinkling lawns and gardens without requiring the constant attention of an attendant. All that is required is to attach the hose to the hydrant and carry the stand to any desired locality, when, by turning on the water, a fountain is produced, and the jet or shower directed to any point. If preferred the nozzle and holder may be made to slowly revolve with a steady or intermittent motion by means of clock-work mechanism.

The nozzle may be attached to any portion of the holder, as desired, and the latter may be made hollow, if preferred, and be provided with several nozzles of any suitable form.

What I claim as my invention is—

The combination of the stand and nozzle-holder A D with the nozzle B and flexible hose H, forming a portable water-fountain and sprinkler, substantially as hereinbefore set forth.

JOSEPH LESSLER.

Witnesses:
  B. H. MUEHLE,
  S. MOYES.

(167)